United States Patent
Kochar et al.

(10) Patent No.: US 9,977,628 B2
(45) Date of Patent: May 22, 2018

(54) STORAGE MODULE AND METHOD FOR CONFIGURING THE STORAGE MODULE WITH MEMORY OPERATION PARAMETERS

(71) Applicant: SanDisk Technologies Inc., Plano, TX (US)

(72) Inventors: Mrinal Kochar, San Jose, CA (US); Shmoolik Yosub, Naharia (IL); Yong Peng, Milpitas, CA (US); Yong Huang, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days. days.

(21) Appl. No.: 14/254,354

(22) Filed: Apr. 16, 2014

(65) Prior Publication Data

US 2015/0301754 A1  Oct. 22, 2015

(51) Int. Cl.
*G06F 12/00* (2006.01)
*G06F 3/06* (2006.01)
*G06F 12/02* (2006.01)

(52) U.S. Cl.
CPC ............ *G06F 3/0679* (2013.01); *G06F 3/061* (2013.01); *G06F 3/0616* (2013.01); *G06F 3/0632* (2013.01); *G06F 3/0634* (2013.01); *G06F 12/0246* (2013.01); *G06F 2206/1014* (2013.01)

(58) Field of Classification Search
CPC ...... G06F 3/0634; G06F 3/0679; G06F 3/061; G06F 3/0616; G06F 3/0632; G06F 12/0246; G06F 2206/1014
See application file for complete search history.

(56) References Cited

U.S. PATENT DOCUMENTS

| | | | | |
|---|---|---|---|---|
| 6,317,849 B1* | 11/2001 | Patel | ....................... | G06F 21/79 711/103 |
| 6,584,541 B2* | 6/2003 | Friedman | ............... | G11C 17/00 711/103 |
| 9,135,190 B1* | 9/2015 | Bruce | .................... | G06F 13/16 |
| 2002/0133684 A1* | 9/2002 | Anderson | ................ | G11C 5/04 711/200 |
| 2005/0226050 A1* | 10/2005 | Crosby | ................... | G11C 16/10 365/185.18 |
| 2006/0018154 A1* | 1/2006 | Ahvenainen | ........ | G06F 12/1433 365/185.04 |
| 2007/0168625 A1* | 7/2007 | Cornwell | ............ | G06F 12/0607 711/157 |
| 2009/0077410 A1* | 3/2009 | Lin | .......................... | G06F 1/08 713/600 |
| 2009/0077436 A1* | 3/2009 | Lo | ........................ | G11C 7/1045 714/718 |
| 2009/0276570 A1* | 11/2009 | Cheng | ................. | G06F 11/3419 711/115 |
| 2011/0167186 A1* | 7/2011 | Elhamias | .............. | G06F 3/0607 710/301 |

* cited by examiner

*Primary Examiner* — Kalpit Parikh
(74) *Attorney, Agent, or Firm* — Brinks Gilson & Lione

(57) ABSTRACT

A storage module and method for configuring the storage module with memory operation parameters are provided. In one embodiment, a storage module is provided comprising a memory and a controller. The controller is configured to receive a selection of one of a plurality of sets of memory operation parameters stored in the storage module and perform at least one of a read operation and a write operation on the memory in accordance with the selected set of memory operation parameters.

33 Claims, 5 Drawing Sheets

| | | | | |
|---|---|---|---|---|
| Optimal read size | OPTIMAL_READ_SIZE | 1 | R | [266] |
| Optimal write size | OPTIMAL_WRITE_SIZE | 1 | R | [265] |
| Optimal trim unit size | OPTIMAL_TRIM_UNIT_SIZE | 1 | R | [264] |
| Cache size | CACHE_SIZE | 4 | R | [252:249] |
| Minimum Write Performance for 8bit at 52MHz | MIN_PERF_W_8_52 | 1 | R | [210] |
| Minimum Read Performance for 8bit at 52MHz | MIN_PERF_R_8_52 | 1 | R | [209] |
| Minimum Write Performance for 8bit at 26MHz, for 4bit at 52MHz | MIN_PERF_W_8_26_4_52 | 1 | R | [208] |
| Minimum Read Performance for 8bit at 26MHz, for 4bit at 52MHz | MIN_PERF_R_8_26_4_52 | 1 | R | [207] |
| Minimum Write Performance for 4bit at 26MHz | MIN_PERF_W_4_26 | 1 | R | [206] |
| Minimum Read Performance for 4bit at 26MHz | MIN_PERF_R_4_26 | 1 | R | [205] |
| Native sector size | NATIVE_SECTOR_SIZE | 1 | R | [63] |
| Sector size | DATA_SECTOR_SIZE | 1 | R | [61] |
| Write reliability setting register | WR_REL_SET | 1 | R/W | [167] |

| Optimal read size | OPTIMAL_READ_SIZE | 1 | R | [266] |
|---|---|---|---|---|
| Optimal write size | OPTIMAL_WRITE_SIZE | 1 | R | [265] |
| Optimal trim unit size | OPTIMAL_TRIM_UNIT_SIZE | 1 | R | [264] |
| Cache size | CACHE_SIZE | 4 | R | [252:249] |
| Minimum Write Performance for 8bit at 52MHz | MIN_PERF_W_8_52 | 1 | R | [210] |
| Minimum Read Performance for 8bit at 52MHz | MIN_PERF_R_8_52 | 1 | R | [209] |
| Minimum Write Performance for 8bit at 26MHz, for 4bit at 52MHz | MIN_PERF_W_8_26_4_52 | 1 | R | [208] |
| Minimum Read Performance for 8bit at 26MHz, for 4bit at 52MHz | MIN_PERF_R_8_26_4_52 | 1 | R | [207] |
| Minimum Write Performance for 4bit at 26MHz | MIN_PERF_W_4_26 | 1 | R | [206] |
| Minimum Read Performance for 4bit at 26MHz | MIN_PERF_R_4_26 | 1 | R | [205] |
| Native sector size | NATIVE_SECTOR_SIZE | 1 | R | [63] |
| Sector size | DATA_SECTOR_SIZE | 1 | R | [61] |
| Write reliability setting register | WR_REL_SET | 1 | R/W | [167] |

Figure 5

STORAGE MODULE AND METHOD FOR CONFIGURING THE STORAGE MODULE WITH MEMORY OPERATION PARAMETERS

BACKGROUND

Storage modules are often manufactured to meet certain memory specifications. For example, the memory specifications for a universal serial bus (USB) drive using X3 memory (i.e., memory that stores three bits per cell) may specify that the memory needs to be manufactured such that its memory cells can endure 100 program erase/cycles and can reliably retain data for three months at 40° C. X2 memory (i.e., memory that stores two bits per cell) is typically associated with stricter product standards, such as being able to endure 3,000 program/erase cycles, having the ability to reliably retain data for one year at 55° C., and having far few number of bad blocks and failed bit counts than X3 memory. If a given memory die does not meet these stricter X2 standards but still meets the less strict X3 standards, the memory die can be repurposed as X3 memory (sometimes referred to as "X2 fallout memory" because the memory die "falls out" of the more-strict product line). As a result, the memory in a USB drive and other storage modules may sometimes greatly exceed the X3 specifications expected of it.

Overview

Embodiments of the present invention are defined by the claims, and nothing in this section should be taken as a limitation on those claims.

By way of introduction, the below embodiments relate to storage module and method for configuring the storage module with memory operation parameters. In one embodiment, a storage module is provided comprising a memory and a controller. The controller is configured to receive a selection of one of a plurality of sets of memory operation parameters stored in the storage module and perform at least one of a read operation and a write operation on the memory in accordance with the selected set of memory operation parameters.

Other embodiments are possible, and each of the embodiments can be used alone or together in combination. Accordingly, various embodiments will now be described with reference to the attached drawings.

BRIEF DESCRIPTION OF THE DRAWINGS

FIG. 5 is a chart of extended card specific data (CSD) register fields for use with an embodiment.

DETAILED DESCRIPTION OF THE PRESENTLY PREFERRED EMBODIMENTS

As mentioned in the background section above, in some circumstances, a memory in a storage module can far exceed its specifications. The following embodiments can be used to take advantage of this by allowing the storage module to be configured with memory operation parameters to customize various attributes of the storage module, such as performance, data retention, number of program/erase cycles, memory capacity, or power consumption, for example. Before turning to these and other embodiments, the following paragraphs provide a discussion of an exemplary storage module that can be used with these embodiments. Of course, these are just examples, and other suitable types of storage modules can be used.

Figure 1:
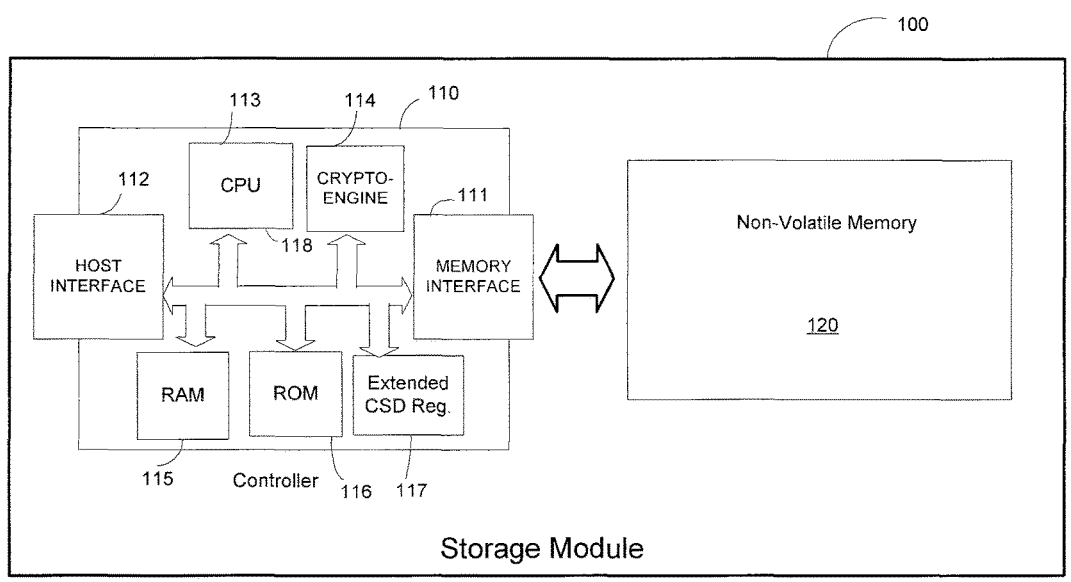
FIG. 1 is a block diagram of an exemplary storage module of an embodiment.

As illustrated in FIG. 1, a storage module 100 of one embodiment comprises a storage controller 110 and non-volatile memory 120. The storage controller 110 comprises a memory interface 111 for interfacing with the non-volatile memory 120 and a host interface 112 for placing the storage module 100 operatively in communication with a host controller. As used herein, the phrase "operatively in communication with" could mean directly in communication with or indirectly in (wired or wireless) communication with through one or more components, which may or may not be shown or described herein.

Figure 2A:
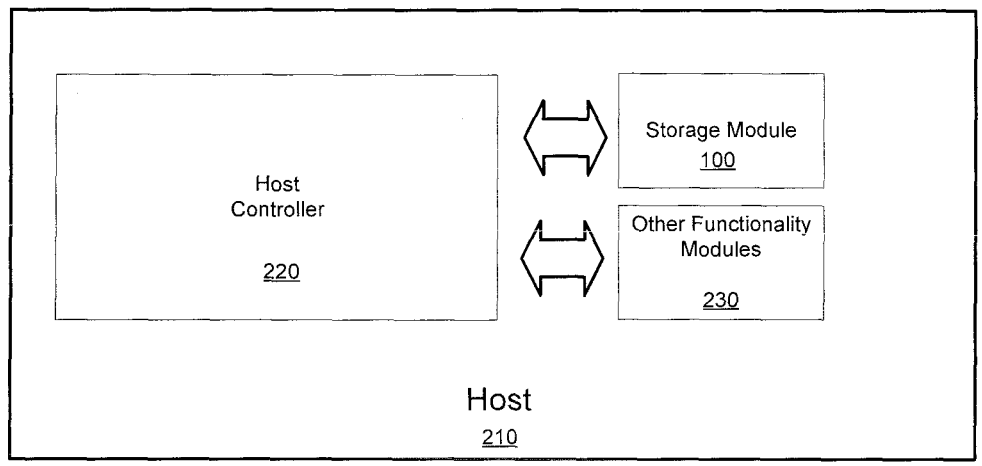
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation, or, more generally, any type of solid state drive (SSD), a hybrid storage device (having both a hard disk drive and a solid state drive), and a memory caching system. The host controller 220 can interface with the embedded storage module 100 using, for example, an eMMC host interface or a UFS interface. The host 210 can take any form, such as, but not limited to, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing. It should be noted that while the host controller 220 can control the storage module 100, the storage module 100 can have its own controller to control its internal memory operations.

Figure 2B:
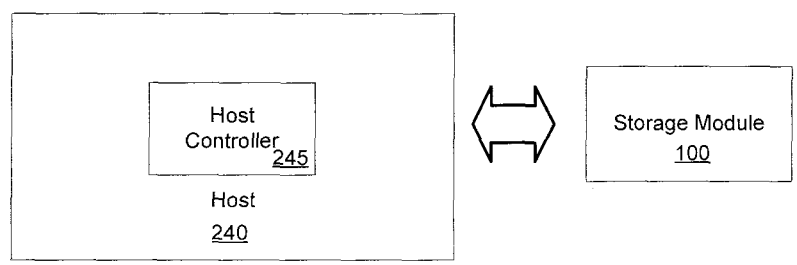
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the storage controller 110, and also conveys memory responses from the storage controller 110 to the host controller 220 (FIG. 2A) or host 240 (FIG. 2B). Also, it should be noted that when the storage module 110 is embedded in the host 210, some or all of the functions described herein as being performed by the storage controller 110 in the storage module 100 can instead be performed by the host controller 220.

Returning to FIG. 1, the storage controller 110 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and an extended Card Specific Data (CSD) register 117, which will be discussed in more detail below. The storage controller 110 can be implemented in any suitable manner. For example, the storage controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. The storage controller 110 can be configured with hardware and/or software to perform the various functions described below and shown in the flow charts. Also, some of the components shown as being internal to the storage controller 110 can also be stored external to the storage controller 110, and other component can be used. For example, the RAM 115 (or an additional RAM unit) can be located outside of the controller die and used as a page buffer for data read from and/or to be written to the memory 120.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed. Also, the non-volatile memory 120 can be a two-dimensional memory or a three-dimensional memory.

As mentioned above, in many situations, a memory for a given storage module product may greatly exceed the specifications expected of it. For example, X3 memory (e.g., in a USB drive) may be "X2 fallout memory" (i.e., memory that does not meet the strict X2 standards but meets (and often exceeds) the less-strict X3 standards). However, there is a relatively-large variance between the X2 and X3 standards. For instance, in some standards, X2 memory needs to be able to endure 3,000 program/erase cycles, while X3 memory only needs to be able to endure 100 program erase/cycles. Similarly, in some standards, X2 memory needs to be able to reliably retain data for one year at 55° C., while X3 memory only needs to be able to reliably retain data for three months at 40° C. Because of this difference, the "X2 fallout memory" used as X3 memory may greatly exceed the specifications expected of it (e.g., instead of being able to endure 10 program erase/cycles, per the specifications, it may be able to endure 100 or 200 program erase/cycles). The embodiments take advantages of this extra "margin" above the specifications to allow a user (either a consumer end-user or an original equipment manufacturer (OEM)) to configure his storage module to how he wants to operate the memory, while still meeting the specifications of the product.

Figure 3:
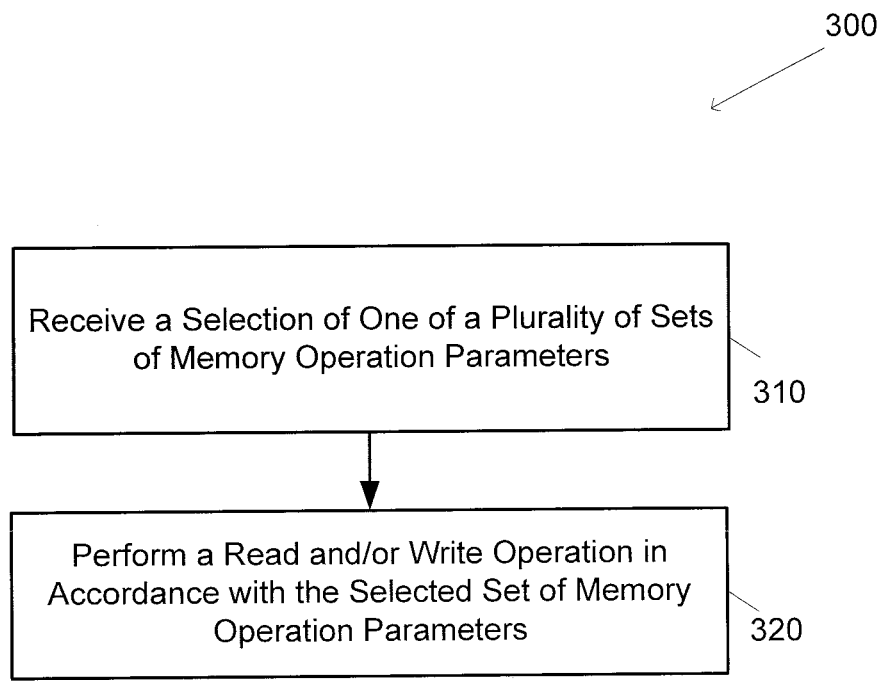
FIG. 3 is a flow chart of a method of an embodiment.

As shown in the flow chart 300 of FIG. 3, controller 110 of the storage module 100 of this embodiment receives a selection of one of a plurality of sets of memory operation parameters (act 310) and performs at least one of a read operation and a write operation on the memory in accordance with the selected set of memory operation parameters (act 320). As used herein, the phrase "memory operation parameters" refers to parameters the control the operation of the memory and affect one or more of the following attributes: performance (i.e., the speed of a read or write operation), data retention, number of program/erase cycles (i.e., endurance), memory capacity, and power consumption. Examples of "memory operation parameters" include, but are not limited to, programming voltage, step size of the programming voltage, program verifying levels, read size, write size, trim unit size, cache size, and sector size. In one embodiment, the set of memory operation parameters takes the form of NAND parameters, while, in another embodiment, the set of memory operation parameters takes the form of values of an extended Card Specific Data (CSD) register. Other types of parameters can be used. Also, as used herein, a "set" can contain one or more than one element.

As memory operation parameters are often interrelated to one another, one can choose to trade off one parameter for another to gain a desired effect. For example, a user can trade off performance with number of program/erase cycles or data retention. So, the user may be given a choice between one set of memory operation parameters that provide a write performance of 6.5 MB/sec and with 300 program/erase cycles, and another set of memory operation parameters (e.g., with a different starting program voltage) that provide a write performance of 10 MB/sec and with 50 program/erase cycles. In this example, a user can obtain a better write performance at the cost of fewer program/erase cycles.

As another example, a user can trade off data retention with performance. So, if a user wants to reliably store data longer than the three months provide for in the X3 standard (e.g., if the user wants to use the storage module as a "data vault"), the user can sacrifice performance for data retention. For instance, by increasing the programming voltage from 2.8 V to 3.5 V, increasing the step size of the programming voltage, and/or by increasing the read verifying levels from 1 V to 1.5 V, one can sacrifice faster write performance for longer data retention.

As yet another example, a user can trade off between the capacity of a storage module for performance or data retention. For example, using a memory as a single level cell (SLC) memory instead of a multi-level cell (MLC) memory can provide faster write performance (e.g., from 5 MB/sec to 20 MB/sec), but can reduce the storage capacity of the memory (e.g., from 16 GB to 8 GB). Using the memory as an SLC memory also provides better data retention/endurance (longer data life). As another example, the amount of programming voltage needed to help ensure data retention may result in relatively-large power consumption. Accordingly, to reduce the amount of power consumed, a smaller amount of programming voltage may be used, which may adverse affect data retention.

It should be noted that the above were merely examples, and other tradeoffs and values can be used. Also, while the above examples were discussed in terms of X2 and X3 technology, these embodiments can be used with any suitable type of memory, including, but not limited to multi-level cell memory, triple-level cell memory, three-dimensional memory, and any other current or future memory technologies. Also, there are many ways in which a set of memory operation parameters can be selected and implemented. The following paragraphs provide a few examples of such ways, and it should be understood that other ways can be used and that the claims should not be limited to a specific technique unless expressly recited therein.

Figure 4:
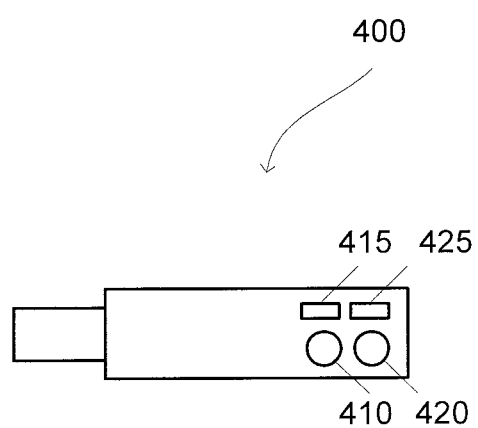
FIG. 4 is an illustration of a storage module of an embodiment.

Any suitable technique can be used to select a set of memory operation parameters. For example, in one embodiment (shown in FIG. 4), a set of memory operation parameters is selected via one or more physical user input elements 410, 420 (e.g., a button or switch) on the storage module 400 itself. Optionally, the storage module 400 can have one or more indicators 415, 425 (e.g., LEDs) to indicate which set of memory operation parameters has been chosen. In another embodiment, the storage module 100 receives the selection from a host controller in communication with the storage controller 110. This selection can be made explicitly, such as when the host controller affirmatively requests a certain set of memory operation parameters or instructs the storage controller 110 of its host category. For example, the storage module 100 can be provisioned with software (preloaded during manufacturing) that can be executed by the host controller at boot up of the storage module 100 to present the user with selection options on the display device of the host. As another example, the storage module 100 can inferentially detect the selection of a set of memory operation parameters, such as when the storage controller 110 infers which set of memory operation parameters to use based on one or more commands received from the host controller. This alternative will be discussed in more detail below.

In some embodiments, the storage module 100 is configured to allow only a one-time selection of the plurality of sets of memory operation parameters. In this way, once the selection is made, the selected set of memory operation parameters are locked-in for the lifetime of the storage module 100. This approach may be preferred if the storage module manufacturer cannot guarantee memory behavior if there is a toggling between the sets of memory operation parameters. However, in other embodiments, the storage module 100 is configured to allow multiple selections of the plurality of sets of memory operation parameters over time.

Irrespective of how the set of memory operation parameters is selected, the storage controller 110 can apply the selected set of memory operation parameters in any suitable way, such that subsequent read and/or write operation(s) are performed in accordance with the selected set of memory operation parameters. For example, in one embodiment, the storage module 100 stores NAND parameters (e.g., in ROM 116 or a ROM fuse in or outside the storage controller 110). When the storage controller 110 received the selection of one of the sets of memory operation parameters, front end firmware can send an application program interface (API) command to the back end firmware to load the chosen set of NAND parameters from storage (e.g., the ROM fuse).

In another embodiment, instead of being NAND parameters, the selected set of memory operation parameters are values for an extended Card Specific Data (CSD) register of the storage module 100. An extended CSD register specifies information on various functions of the storage module 100, and the fields of this register are typically set with default values according to a general parameter file that do not take host-specific needs into consideration. FIG. 5 is a chart of exemplary extended CSD register fields. These fields include, but are not limited to, optimal read size, optimal write size, optimal trim unit size, cache size, minimum write performance for 8 bit at 52 MHz, minimum read performance for 8 bit at 52 MHz, minimum write performance for 8 bit at 26 MHz and for 4 bit at 52 MHz, minimum read performance for 8 bit at 26 MHz and for 4 bit at 52 MHz, minimum write performance for 4 bit at 26 MHz, minimum read performance for 4 bit at 26 MHz, native sector size, and sector size. The first column in the chart shows the names of the field, and the second column is the short form of the name. The third column specifies the number of bytes in the field, and the fourth column indicates that whether the field is read only (R) or writable (W) by a host controller. Note that even if a field is read only to the host controller, the value of the field can be set or changed by the storage controller 110. The last column in the chart indicates the field's location in the extended CSD register.

As with the NAND parameter example discussed above, the values in the various fields of the extended CSD register can be altered to trade off one or more of performance, data retention, number of program/erase cycles, and power consumption. Consider, for example, a storage module that has a sequential write performance of 3 MB/s in 32K "chunk" sizes. If a better write performance is desired (e.g., 7 MB/s), the storage controller 110 can change the default value of write reliability (WR_REL_SET) in the extended CSD register to zero instead of one to turn off this feature (this feature, which deals with how to write data to survive a power loss, may not be desired if the storage module is embedded in a host with a battery). Other fields that can affect performance are, for example, different power classes to control power consumption, enabling/disabling packed commands, and enabling/disabling the system cache.

As discussed above, the selection of a set of memory operation parameters (in this embodiment values of the fields of the extended CSD register) can be perform in any suitable way. In one embodiment, the storage module 100 stores a table of host categories (e.g., audio devices, video devices, smart phones, etc.) and an associated set of values of the fields of the extended CSD register. The extended CSD register can have a field to indicate the host category code, and all the default settings can be determined according to this category. The use of host categories allows storage modules to be organized into categories of products to allow OEM and other customers to optimize their usage of the storage module 100. For example, different vendors may want to adjust performance/endurance/power consumption of the storage modules embedded in their devices to match their product needs (e.g., an iNAND-embedded drive with a USB interface). In this way, the desired parameters can be determined in the field (by the customer) by changing predefined vendor specific fields in the extended CSD register. These vendor-specific fields can be communicated to the customer as customizable options of the storage module 100.

In one embodiment, the host category is communicated from the host controller to the storage controller 110 using a File-Based Communication Channel (FBCC) command, which gives the host controller the ability to send commands to the storage module 100 that are not defined in the product specification. In another embodiment, instead of a user directly selecting a set of memory operation parameters, the storage module 100 (e.g., via a "smart" algorithm) can determine what category the host belongs to from one or more commands received from the host controller and, therefore, inferentially detect the selection of a set of memory operation parameters. In this way, the storage controller 110 can automatically "tune" the extended CSD parameters. The advantage with this alternative is that the host controller does not need to change its behavior or use a special command to communicate the host category to the storage controller 110.

In operation, upon installation of the storage module 100 in the host, the storage controller 110 can analyze one or more commands received from the host controller to compile statistics on how the host controller is using the storage module 100 and compare those statistics to known host behaviors. For example, if the storage controller 110 detects that the user tends to write large chucks of data in sequential order, the storage controller 110 can infer that the host is a camera shooting video and can select that host category to configure the appropriate memory operation parameters, thereby making itself optimized for its category of use. For example, if the storage controller 110 understands that the user writes/reads large chunks of data, it can increase the native sector size (block size: 512 bytes or 4 K), use more of the cache, or revise the values of the optimal read size, optimal write size, or optimal trim unit size parameters. As another example, if the storage controller 110 understands that the user writes/reads small random chunks of data, it can decrease the native sector size, use more of the cache, or revise the values of the optimal read size, optimal write size, or optimal trim unit size parameters. As yet another example, if the storage controller 110 understands that the user tends to use many secure commands to write data (e.g., a sub protocol within the eMMC replay protected memory block (RPMB)), it can change the value of WR_REL_SET accordingly or leverage more use of SLC in the memory.

After the optimization for a particular host category, the storage controller 110 can continue to collect statistics, and if it understands that it has been shifted to a different category of use, it can re-optimize itself for the new use. While this example was discussed in terms of the host being a video camera, a similar process can be performed for other host categories (e.g., smart phone, TV, GPS), each with its own identifying statistics.

There are many alternatives that can be used with these embodiments. For example, instead of the storage controller 110 chooses one of a plurality of sets of stored memory operation parameters, the storage controller 110 can use the flash translation layer (FTL) (sometimes referred to as the media management layer (MML)) of its firmware to direct the storage of data in such a way to provide the performance, data retention, number of program/erase cycles, memory capacity, and power consumption trade-offs discussed above. For example, a memory cell may be designed as a "flex cell," in which the cell can either be used as a single-level cell (SLC) or a multi-level cell (MLC), as determined by the storage controller 110. So, to make a tradeoff between performance and endurance, the storage controller 110 can configure the cells to SLC cells (because it is faster to write to SLC cells than MLC cells), and then, at a later time (e.g., as a background operation), move the data from the SLC cells to the MLC cells (which reduces the endurance of the storage module 100 since another program/ erase cycle is used for that transfer).

Finally, as mentioned above, semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EE-PROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/ or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage module comprising:
   a memory, wherein the memory exceeds specifications designated for the storage module;
   a storage controller in operative communication with the memory, wherein the storage controller is configured to:
   receive a selection of one of a plurality of sets of memory operation parameters stored in the storage module, wherein the selected set of memory operation parameters is outside of the specifications designated for the storage module; and
   perform at least one of a read operation and a write operation on the memory in accordance with the selected set of memory operation parameters, wherein the at least one of the read operation and the write operation can be performed in accordance with the selected set of memory operation parameters because the memory exceeds the specifications designated for the storage module, and wherein the plurality of sets of memory operation parameters comprise first and second sets of memory operation parameters that provide different tradeoffs between endurance and data retention, wherein the first set of memory operation parameters provide higher endurance at a cost of lower data retention, and wherein the second set of memory operation parameters provide higher data retention at a cost of lower endurance.

2. The storage module of claim 1, wherein the selection is received via a physical user input element on the storage module.

3. The storage module of claim 1, wherein the selection is received from a host controller in communication with the storage controller.

4. The storage module of claim 1, wherein the selection is an identification of a host category.

5. The storage module of claim 4, wherein the identification of the host category is inferred from one or more commands received from a host controller in communication with the storage controller.

6. The storage module of claim 1, wherein the plurality of sets of memory operation parameters comprise NAND parameters.

7. The storage module of claim 1, wherein the plurality of sets of memory operation parameters comprise values of an extended card specific data (CSD) register.

8. The storage module of claim 1, wherein the storage controller is further configured to allow only a one-time selection of the plurality of sets of memory operation parameters.

9. The storage module of claim 1, wherein the storage controller is further configured to allow multiple selections of the plurality of sets of memory operation parameters over time.

10. The storage module of claim 1, wherein the memory operation parameters affect one or more of the following: performance, data retention, number of program/erase cycles, memory capacity, and power consumption.

11. The storage module of claim 1, wherein the memory is a three-dimensional memory.

12. The storage module of claim 1, wherein the storage module is embedded in a host.

13. The storage module of claim 1, wherein the storage module is removably connectable to a host.

14. The storage module of claim 13, wherein the storage module is a universal serial bus (USB) drive.

15. A method for configuring a storage module with memory operation parameters, the method comprising:
  performing the following in a storage controller of a storage module having a memory in operative communication with the storage controller, wherein the storage module stores a plurality of sets of memory operation parameters and associates each of the sets with a host category, wherein the memory exceeds specifications designated for the storage module:
    receiving an identification of a host category;
    selecting one of the plurality of sets of memory operation parameters associated with the received identification of the host category, wherein the selected set of memory operation parameters is outside of the specifications designated for the storage module: and
    performing at least one of a read operation and a write operation on the memory in accordance with the selected set of memory operation parameters, wherein the at least one of the read operation and the write operation can be performed in accordance with the selected set of memory operation parameters because the memory exceeds the specifications designated for the storage module, and wherein the plurality of sets of memory operation parameters comprise first and second sets of memory operation parameters that provide different tradeoffs between endurance and data retention, wherein the first set of memory operation parameters provide higher endurance at a cost of lower data retention, and wherein the second set of memory operation parameters provide higher data retention at a cost of lower endurance.

16. The method of claim 15, wherein the identification of the host category is received via a physical user input element on the storage module.

17. The method of claim 15, wherein the identification of the host category is received from a host controller in communication with the storage controller.

18. The method of claim 15, wherein the identification of the host category is inferred from one or more commands received from a host controller in communication with the storage controller.

19. The method of claim 15, wherein the plurality of sets of memory operation parameters comprise NAND parameters.

20. The method of claim 15, wherein the plurality of sets of memory operation parameters comprise values of an extended card specific data (CSD) register.

21. The method of claim 15 further comprising allowing only a one-time selection of the plurality of sets of memory operation parameters.

22. The method of claim 15 further comprising allowing multiple selections of the plurality of sets of memory operation parameters over time.

23. The method of claim 15, wherein the memory operation parameters affect one or more of the following: performance, data retention, number of program/erase cycles, memory capacity, and power consumption.

24. The method of claim 15, wherein the memory is a three-dimensional memory.

25. The method of claim 15, wherein the storage module is embedded in a host.

26. The method of claim 15, wherein the storage module is removably connectable to a host.

27. The method of claim 26, wherein the storage module is a universal serial bus (USB) drive.

28. A configurable universal serial bus (USB) drive, the configurable USB drive comprising:
  a memory, wherein the memory exceeds specifications designated for a USB drive;
  a storage controller in operative communication with the memory, wherein the storage controller is configured to:
    receive a selection of one of a plurality of sets of memory operation parameters stored in the configurable USB drive, wherein the selected set of memory operation parameters is outside of the specifications designated for the USB drive; and
    perform at least one of a read operation and a write operation on the memory in accordance with the selected set of memory operation parameters, wherein the at least one of the read operation and the write operation can be performed in accordance with the selected set of memory operation parameters because the memory exceeds the specifications designated for the USB drive, and wherein the plurality of sets of memory operation parameters comprise first and second sets of memory operation parameters that provide different tradeoffs between endurance and data retention, wherein the first set of memory operation parameters provide higher endurance at a cost of lower data retention, and wherein the second set of memory operation parameters provide higher data retention at a cost of lower endurance.

29. The configurable USB drive of claim 28, wherein the selection is received via a physical user input element on the configurable USB drive.

30. The configurable USB drive of claim 28, wherein the selection is received from a host controller in communication with the storage controller.

31. The configurable USB drive of claim 28, wherein the storage controller is further configured to allow only a one-time selection of the plurality of sets of memory operation parameters.

32. A storage module comprising:
  a memory, wherein the memory exceeds specifications designated for the storage module;
  means for receiving a selection of one of a plurality of sets of memory operation parameters stored in the storage module, wherein the selected set of memory operation parameters is outside of the specifications designated for the storage module; and
  means for performing at least one of a read operation and a write operation on the memory in accordance with the selected set of memory operation parameters, wherein the at least one of the read operation and the write operation can be performed in accordance with the selected set of memory operation parameters because the memory exceeds the specifications designated for the storage module, wherein the plurality of sets of memory operation parameters comprise first and second sets of memory operation parameters that provide different tradeoffs between endurance and data retention, wherein the first set of memory operation parameters provide higher endurance at a cost of lower data retention, and wherein the second set of memory operation parameters provide higher data retention at a cost of lower endurance.

33. The storage module of claim 32, wherein the memory is a three-dimensional memory.

* * * * *